United States Patent [19]
Abrahamson

[11] Patent Number: 5,157,906
[45] Date of Patent: Oct. 27, 1992

[54] DRIVE MOTION TRANSMITTING ASSEMBLY FOR DRIVING A SICKLE BAR

[76] Inventor: Roy W. Abrahamson, Rte. 1, Box 60B, Garfield, Kans. 67529

[21] Appl. No.: 795,064

[22] Filed: Nov. 20, 1991

[51] Int. Cl.$^5$ .............................. A01D 34/10
[52] U.S. Cl. ............................. 56/17.6; 56/260; 56/296
[58] Field of Search ............. 56/17.6, 16.7, 242, 56/243, 296, 298, 306, 297, 260, 261

[56] References Cited

U.S. PATENT DOCUMENTS

| | | | |
|---|---|---|---|
| 1,770,091 | 7/1930 | Soss | 56/17.6 |
| 2,269,007 | 1/1942 | Clark | 56/17.6 |
| 2,680,340 | 6/1954 | Pazandak | 56/17.6 |
| 2,733,565 | 2/1956 | Kearney | 56/17.6 |
| 3,546,864 | 12/1970 | White | 56/296 |
| 3,561,200 | 2/1971 | Minunno | 56/17.6 |
| 3,657,868 | 4/1972 | Cousino | 56/17.6 |
| 3,701,238 | 10/1972 | Hintze, Jr. | 56/296 X |
| 3,796,104 | 3/1974 | Templeton | 56/306 X |
| 3,941,003 | 3/1976 | Garrison et al. | 56/296 X |
| 4,048,791 | 9/1977 | Treen | 56/17.6 |
| 4,107,906 | 8/1978 | Cousino | 56/17.6 |
| 4,866,921 | 9/1989 | Nagashima et al. | 56/257 |
| 4,942,725 | 7/1990 | Ruder, Sr. | 56/16.9 |

FOREIGN PATENT DOCUMENTS 11919 8/1899 Sweden ....................... 56/261

Primary Examiner—Terry Lee Melius
Attorney, Agent, or Firm—John R. Flanagan

[57] ABSTRACT

A drive motion transmitting assembly is mounted to a mowing implement which also mounts a power drive source having a rotary output drive shaft and a reciprocatory sickle bar. The assembly include a motion converting member, a plurality of idler members, and a drive motion transmitting flexible arrangement. The motion converting member is rotatably mounted about an axis and is drivingly interconnected to the output drive shaft for rotating about the axis upon rotation of the output drive shaft. The motion converting member has a portion spaced from the axis which undergoes orbital movement about the axis as the motion converting member rotates about the axis. The idler members are rotatably mounted both adjacent to and remote from the sickle bar and the motion converting member and in spaced relation to one another for guiding the transmission of drive motion from the motion converting member to the sickle bar. The drive motion transmitting flexible arrangement is entrained about the idler members for undergoing reciprocatory movement relative thereto. The motion transmitting flexible arrangement includes a first portion connected to the orbital portion of the motion converting member and a second portion connected to the sickle bar such that the motion transmitting flexible arrangement reciprocally moves and transmits reciprocatory drive motion to the sickle bar as the motion converting member rotates and applies orbital motion to the motion transmitting flexible arrangement.

22 Claims, 2 Drawing Sheets

DRIVE MOTION TRANSMITTING ASSEMBLY FOR DRIVING A SICKLE BAR

BACKGROUND OF THE INVENTION

1. Field of the Invention

The present invention generally relates to drive assemblies for sickle bars of mowing implements and, more particularly, to a drive motion transmitting assembly for driving a sickle bar.

2. Description of the Prior Art

Many mowing implements from large self-propelled and tractor-pulled swathers and combines to small hand-guided mowers employ an elongated sickle bar. The sickle bar typically has a row of sickle knives reciprocally driven relative to a plurality of stationary sickle guards to cut materials ranging from stalk crops to grass and weeds.

A Pitman-type drive motion transmitting assembly is typically utilized to translate a rotary drive motion of a rotating drive shaft into a reciprocatory drive motion which is applied to one end of the sickle bar. The Pitman-type drive motion transmitting assembly has an arrangement of components which often impose such intense shocks and stresses on the sickle bar that cracks are generated at the location where the assembly connects to the sickle bar. Such cracks will lead to early fracturing and thus there is a need for frequent repairs to the sickle bar. Also, an intense level of vibrations are typically set up in the frame of the implement by the Pitman-type drive motion transmitting assembly which, particularly in the case of hand-guided mowing implements, are transmitted to the handlebars of the mowing implement, providing discomfort to the hands and arms of the operator and making it difficult for the operator to control of the movement of the mowing implement.

Over the years, motion transmitting assemblies of many different designs have been proposed in the prior patent art for reciprocally driving the sickle bars of small hand-guided mowing implements. Representative of these prior art drive motion transmitting assemblies are the ones disclosed in U.S. Pat. No. 1,770,091 to Soss, Clark U.S. Pat. No. 2,269,007, Pazandak U.S. Pat. No. 2,680,340, Kearney U.S. Pat. No. 2,733,565, Minunno U.S. Pat. No. 3,561,200, Cousino U.S. Pat. Nos. 3,657,868 and 4,107,906, Treen U.S. Pat. No. 4,048,791, Nagashima et al U.S. Pat. No. 4,866,921 and Ruder, Sr. U.S. Pat. No. 4,942,725. While most of the drive motion transmitting assemblies of these prior art designs probably function satisfactorily under the limited range of conditions for which they were intended, they are not believed to provide an effective solution to the problems experienced with the Pitman-type drive motion transmitting assembly.

Consequently, a need exists for a still different approach to driving the sickle bar of a mowing implement, and particularly of a small hand-guided mowing implement, so as to reduce, if not eliminate, the problems which have been experienced heretofore.

SUMMARY OF THE INVENTION

The present invention provides an improved drive motion transmitting assembly designed to satisfy this need. The drive motion transmitting assembly of the present invention is capable of translating rotary drive motion into reciprocatory drive motion and transmitting the reciprocatory drive motion to the sickle bar in a manner which substantially reduces the level of vibrations that are typically set up in the implement by the prior art Pitman-type drive motion transmitting assembly.

The drive motion transmitting assembly of the present invention is preferably provided in a mowing implement which includes a mobile frame, a power drive source mounted on the frame having a rotatable output drive shaft for providing rotary drive motion, and a sickle bar mounted on the frame for undergoing reciprocatory movement relative to the frame. The drive motion transmitting assembly comprises a motion converting member, a plurality of idler members, and a motion transmitting flexible arrangement.

The motion converting member of the assembly is rotatably mounted about an axis and drivingly coupled to the output drive shaft for rotating about the axis upon rotation of the output drive shaft. The motion converting member has one portion spaced from the axis which undergoes orbital movement about the axis as the motion converting member rotates about the axis. The motion converting member also has an opposite portion spaced from the axis in opposite relation to the one portion such that, as the motion converting member rotates about the axis, the opposite portion undergoes an orbital movement about the axis that counterbalances the orbital movement of the one portion about the axis.

The plurality of idler members of the assembly are rotatably mounted adjacent to and remote from both the sickle bar and the motion converting member. The idler members are also mounted in spaced relation to one another for guiding the transmission of drive motion from the motion converting member to the sickle bar.

The motion transmitting flexible arrangement of the assembly is entrained about the idler members to undergo reciprocatory movement relative thereto. The motion transmitting flexible arrangement includes a first portion connected to the first orbital portion of the motion converting member and a second portion connected to the sickle bar such that the motion transmitting flexible arrangement reciprocally moves and transmits reciprocatory drive motion to the sickle bar as the motion converting member rotates and applies orbital motion to the motion transmitting flexible arrangement.

More particularly, in one embodiment, the first portion of the motion transmitting flexible arrangement is a first elongated motion transmitting flexible member entrained about a first group of the idler members and connected to the first portion of the motion converting member. The second portion of the motion transmitting flexible arrangement is a second elongated motion transmitting flexible member entrained about a second group of the idler members and connected to the sickle bar. One of the idler members of the first group and one of the idler members of the second group are mounted on a common rotatable shaft such that the reciprocal movement of the first motion transmitting flexible member is transmitted to the second motion transmitting flexible member by the common rotatable shaft.

In another embodiment, the motion transmitting arrangement is a single motion transmitting flexible member with the first portion thereof connected to the one portion of the motion converting member and the second portion thereof connected to the sickle bar. The idler members include a first pair of the idler members being rotatably mounted remote from the sickle bar and in spaced relation to one another. The idler members also include a second pair of the idler members being rotatably mounted adjacent to the sickle bar and in spaced relation to one another and to the idler members of the first pair thereof.

These and other features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

In the following detailed description, reference will be made to the attached drawings in which.

DETAILED DESCRIPTION OF THE PREFERRED EMBODIMENTS

Figure 1:
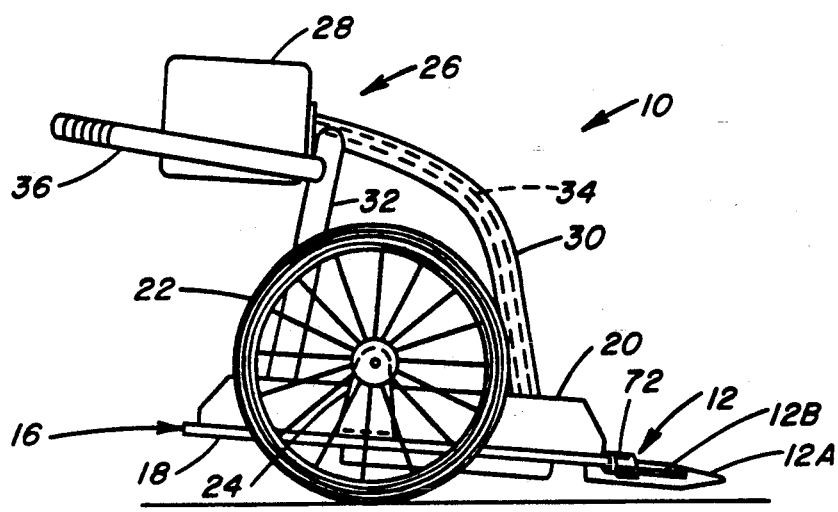
FIG. 1 is a side elevational view of a hand-guided mowing implement incorporating a sickle bar drive motion transmitting assembly of the present invention.
Figure 2:
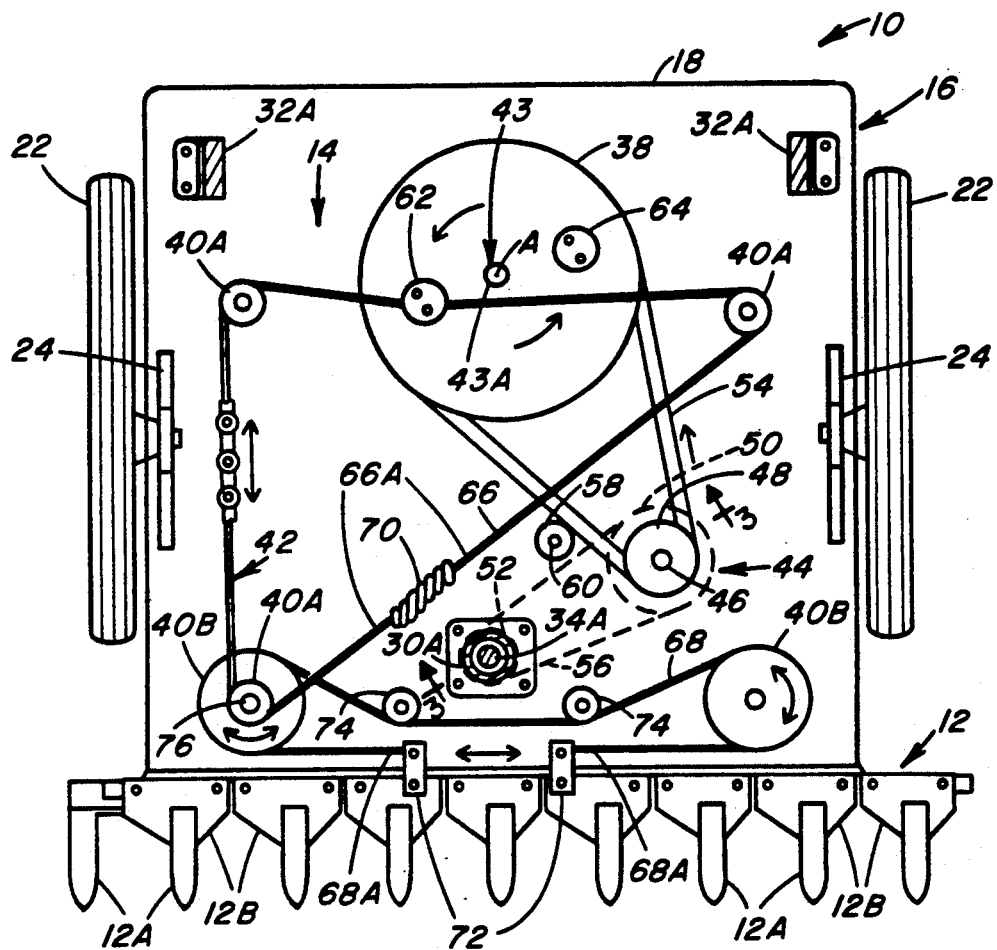
FIG. 2 is an enlarged top plan view of the drive motion transmitting assembly of the present invention.

Referring to the drawings, and particularly to FIGS. 1 and 2, there is illustrated a hand-guided mowing implement, generally designated 10. The mowing implement 10 has a conventional sickle bar 12 and incorporates a drive motion transmitting assembly 14 in accordance with the present invention for translating rotary drive motion into reciprocal drive motion for application to the sickle bar 12.

Although, the drive motion transmitting assembly 14 of the present invention is illustrated and will be described hereinafter in conjunction with the hand-guided mowing implement 10, it should be understood that the drive motion transmitting assembly 14 is not so limited in its applications. It can readily be incorporated by other mowing implements, such as on conventional headers of swathers and combines which employ a sickle bar.

In addition to the conventional sickle bar 12, the hand-guided mowing implement 10 has a mobile frame 16 which includes a platform 18, a cover 20 overlying and supported on the platform 18, and pair of ground-engaging wheels 22 mounted at opposite sides of the platform 18 by a pair of brackets 24 attached upright on opposite side edge portions of the platform. The sickle bar 12 has guards 12A stationarily mounted along the forward end of the platform 18 and sickle knives 16B which move in reciprocatory fashion relative to the guards 12A and transverse to the direction of forward travel.

The mowing implement 10 also has a power drive source 26 which includes an engine 28 mounted above the platform 18, and the cover 20 thereon, by a hollow rigid arcuate-shaped main column 30 and a pair of oppositely-inclined support braces 32 which are attached at their lower ends 30A, 32A to the platform 18 and extend upwardly therefrom through the cover 20. The power drive source 26 also includes an elongated flexible rotatable output drive shaft 34 drivingly connected at an upper end (not shown) to the engine 28 and extending downwardly through the main column 28 to a lower end 34A located below the platform 18.

The mowing implement 10 also includes handlebars 36 attached to the upper portions of the support braces 32 and extending rearwardly therefrom past the engine 28. The rear ends of the handlebars 36 can be gripped by the hands of an operator for applying the necessary force to the mobile frame 16 to manually propel and guide the implement 10.

Figure 4:
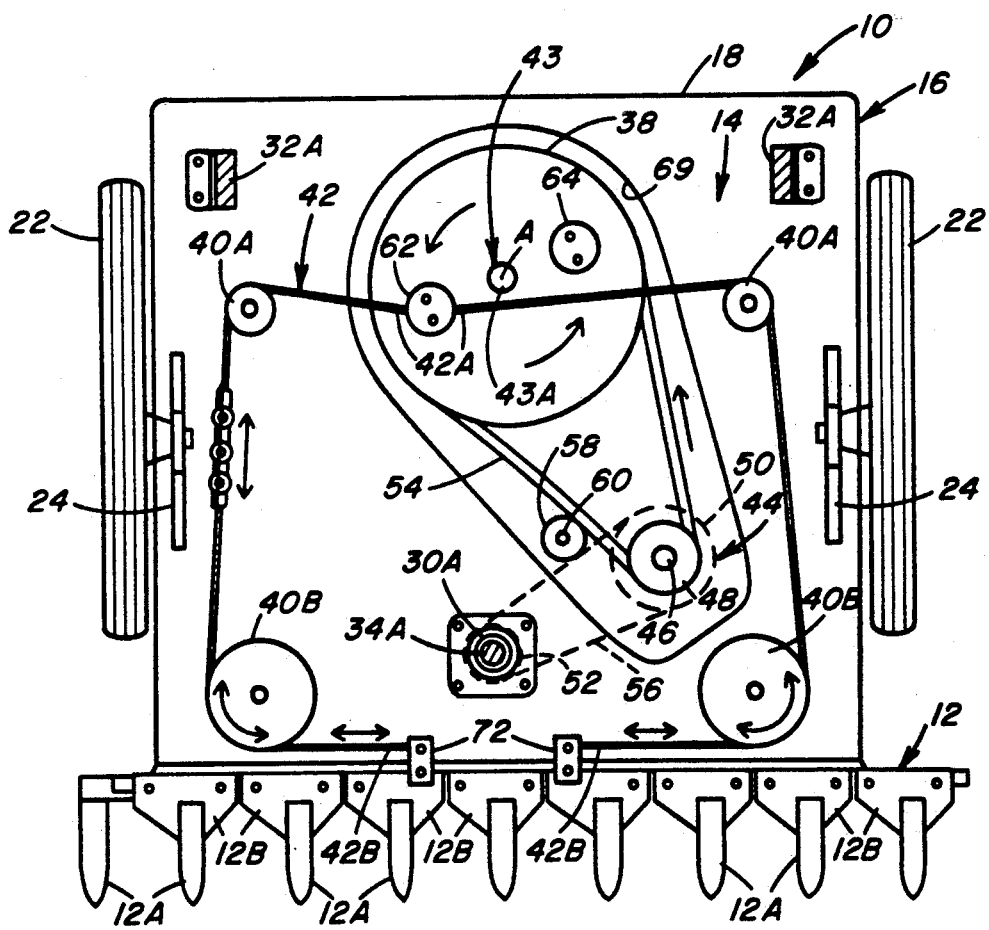
FIG. 4 is a view similar to that of FIG. 2 of a modified form of the drive motion transmitting assembly.

Two preferred embodiments of the drive motion transmitting assembly 14 of the present invention are illustrated in the drawings. A first embodiment is shown in FIG. 2. A second embodiment is shown in FIG. 4. Both embodiments of the assembly 14 basically includes a motion converting member 38, a plurality of idler members 40, and a drive motion transmitting flexible arrangement 42.

The motion converting member 38 of the assembly 14 is disposed above the platform 18, being attached on an upper end 43A of a shaft 43, The shaft 43, in turn, is rotatably mounted to and extends through the platform 18 and defines a rotational axis A. The motion converting member 38 is drivingly coupled to the output drive shaft 34 of the power drive source 26 for undergoing rotation about the axis A upon rotation of the output drive shaft 34. As illustrated in FIGS. 2 and 4, the motion converting member 38 can take the form of a belt-driven pulley.

Figure 3:
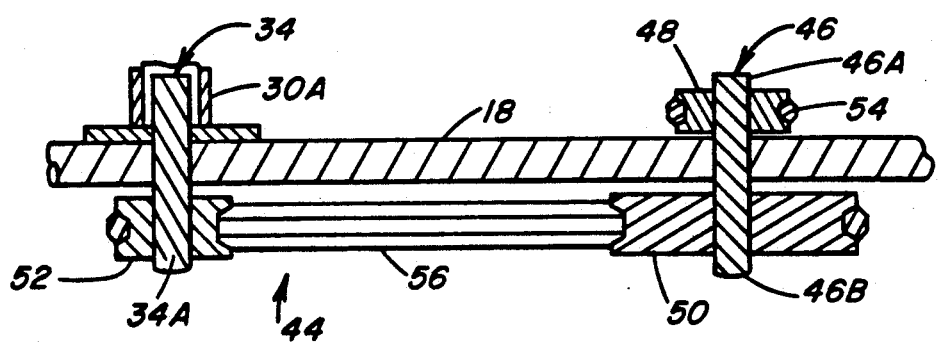
FIG. 3 is an enlarged sectional view of a speed reducing assembly taken along line 3—3 of FIG. 2.

Referring to FIGS. 2 and 3, the motion converting member 38 is drivingly coupled to the output drive shaft 34 by a speed reducing assembly 44 for providing a desired speed ratio between the output drive shaft 34 and motion converting member 38. By way of example, the speed reducing assembly 44 includes an intermediate shaft 46 rotatably mounted to and extending through the platform 18 so as to have opposite ends respectively disposed above and below the platform 18. Also, the speed reducing assembly 44 includes first, second and third pulleys 48, 50 and 52 and first and second endless flexible belts 54, 56. The first pulley 48 is attached on the upper end 46A of the intermediate shaft 46 and thus disposed above the platform 18, while the second pulley 50 is attached on the lower end 46B of the shaft 46 and thus disposed below the platform 18. The third pulley 52 is attached on the lower end 34A of the output drive shaft 34 below the platform 18. The first belt 54 disposed above the platform 18 is entrained about and extends between the first pulley 48 and the motion converting pulley 38. The second belt 56 disposed below the platform 18 is entrained about and extends between the second and third pulleys 50, 52. Also, a fourth pulley 58 disposed above the platform 18 is rotatably mounted by another shaft 60 to the platform 18 adjacent to and engaged with the first belt 54 in order to apply the desired amount of tensioning to the belt 54.

Further, the motion converting member 38 has a first portion 62, for instance in the form of a connector mounted on the member 38, spaced from the rotational axis A so as to undergo orbital movement about the axis A as the motion converting member 38 rotates about the same axis A. The motion converting member 38 also has a second portion 64, for instance in the form of a counterweight mounted on the member 38, spaced from the rotational axis A in an opposite relation to the first portion 62. As the motion converting member 38 rotates about the axis A, the second portion 64 undergoes an orbital movement about the axis A that counterbalances the orbital movement of the first portion 62 and thereby reduces the amount of vibration that may be generated by the rotation of the motion converting member 38.

The plurality of idler members 40 of the drive motion transmitting assembly 14 are rotatably mounted both adjacent to and remote from the sickle bar 12 and the motion converting member 38. The idler members 40 are also mounted in spaced relation to one another for guiding the transmission of drive motion from the motion converting member 38 to the sickle bar 12. The drive motion transmitting flexible arrangement 42 of the assembly 14 are entrained about the idler members 40 for undergoing reciprocatory movement relative thereto. The drive motion transmitting flexible arrangement 42 includes a first portion 66 connected to the first orbital portion 62 of the motion converting member 38 and a second portion 68 connected to the sickle bar 12 such that the drive motion transmitting flexible arrangement 42 reciprocally moves and transmits reciprocatory drive motion to the sickle bar 12 as the motion converting member 38 rotates and applies orbital motion to the drive motion transmitting flexible arrangement 42.

More particularly, in the first embodiment of the assembly 14 shown in FIG. 2, the first portion 66 of the drive motion transmitting flexible arrangement 42 is a first elongated motion transmitting flexible member 66 entrained about a first group of the idler members 40A and connected to the first portion 62 of the motion converting member 38. The first motion transmitting flexible member 66 has a pair of ends 66A being connected to one another by a coiled spring 70 which absorbs any shock created in the constant changing of the direction of the reciprocal movement of the flexible member 66.

Also, the second portion 68 of the drive motion transmitting flexible arrangement 42 is a second elongated motion transmitting flexible member 68 entrained about a second group of the idler members 40B and connected to the sickle bar 12. The second motion transmitting flexible member 68 has a pair of ends 68A attached by brackets 72 to the sickle bar 12 at locations thereon being spaced from one another. Spaced auxiliary idler members 74 are rotatably mounted on the platform 18 adjacent to the sickle bar 12 and adjacent to and engaged with the second motion transmitting flexible member 68 for applying a desired level of tensioning thereto.

One of the idler members 40A of the first group and one of the idler members 40B of the second group are mounted on a common rotatable shaft 76 which, in turn, is rotatably mounted on the platform 18. The shaft 76 rotates and thereby transmits the reciprocal movement of the first motion transmitting flexible member 66 to the second motion transmitting flexible member 68.

In the second embodiment of the assembly 14 shown in FIG. 4, the motion converting member 38 and the speed reducing assembly 44 are mounted in a depression or recess 69 formed in the platform 18. This permits the motion converting member 38 to be positioned at the same level as the idler members 40 above the platform 18 such that the motion transmitting flexible arrangement 42 can now be a single motion transmitting flexible member 42 with the first portion 66 thereof connected to the one portion 62 of the motion converting member 38 and the second portion 68 thereof connected to the sickle bar 12. The idler members 40 include a first pair of the idler members 40A being rotatably mounted remote from the sickle bar 12 and in spaced relation to one another. The idler members 40 also include a second pair of the idler members 40B being rotatably mounted adjacent to the sickle bar 12 and in spaced relation to one another and to the idler members 40A of the first pair thereof. The motion converting member 38 is disposed generally between the first idler members 40A. The single motion transmitting flexible member 42 is attached at its ends 42A to the connector 62 of the motion converting member 38 and attached at its ends 42B to the spaced brackets 72 on the sickle bar 12.

The pair of first and second flexible members 66, 68 and the single flexible member 42 are preferably in the form of drive chains. The plurality of idler members 40 and auxiliary idler members 74 are preferably in the form of sprocket gears which intermesh with the drive chains. As an alternative the motion converting member 38 can be a sprocket gear which is capable of being adjusted so as to offset the rotational axis A from the center of the gear such that the first portion 62 of the gear 38 is offset from the axis A.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. A drive motion transmitting assembly for driving a reciprocatory sickle bar from a source of rotary drive motion, comprising:
   (a) a motion converting member rotatably mounted about an axis and drivingly coupled to the output drive shaft for rotating about said axis upon rotation of the output drive shaft, said motion converting member having one portion spaced from said axis which undergoes orbital movement about said axis as said motion converting member rotates about said axis;
   (b) a plurality of idler members rotatably mounted adjacent to and remote from both said sickle bar and said motion converting member and in spaced relation to one another for guiding the transmission of drive motion from said motion converting member to said sickle bar; and
   (c) a motion transmitting flexible arrangement entrained about said idler members for undergoing reciprocatory movement relative thereto, said motion transmitting flexible arrangement including a first portion connected to said one portion of said motion converting member and a second portion connected to said sickle bar such that said motion transmitting flexible arrangement reciprocally moves and transmits reciprocatory drive motion to said sickle bar as said motion converting member rotates and applies orbital motion to said motion transmitting flexible arrangement.

2. The assembly of claim 1 wherein said motion converting member also has an opposite portion spaced from said axis in opposite relation to said one portion such that, as said motion converting member rotates about the axis, said opposite portion undergoes an orbital movement about said axis that counterbalances the orbital movement of said one portion about the axis.

3. The assembly of claim 1 wherein said first portion of said motion transmitting flexible arrangement is a first elongated motion-transmitting flexible member entrained about a first group of said idler members and connected to said one portion of said motion converting member.

4. The assembly of claim 3 wherein said first motion transmitting flexible member has a pair of ends being connected to one another by a coiled spring.

5. The assembly of claim 3 wherein said second portion of said motion transmitting flexible arrangement is a second elongated motion-transmitting flexible member entrained about a second group of said idler members and connected to said sickle bar.

6. The assembly of claim 5 further comprising:
a pair of additional idler members rotatably mounted adjacent to the sickle bar and adjacent to and engaged with said second motion transmitting flexible member.

7. The assembly of claim 5 wherein said second motion transmitting flexible member has a pair of ends being attached to the sickle bar at locations thereon being spaced from one another.

8. The assembly of claim 5 wherein one of said idler members of said first group and one of said idler members of said second group are mounted on a common rotatable shaft such that the reciprocal movement of said first motion transmitting flexible member is transmitted to said second motion transmitting flexible member by said common rotatable shaft.

9. The assembly of claim 1 wherein said idler members include a first pair of said idler members being rotatably mounted remote from the sickle bar and in spaced relation to one another.

10. The assembly of claim 9 wherein said idler members also include a second pair of said idler members being rotatably mounted adjacent to the sickle bar and in spaced relation to one another and to said idler members of said first pair thereof.

11. The assembly of claim 10 wherein said motion transmitting arrangement is a single elongated motion-transmitting flexible member entrained about said first and second pairs of idler members and having said first portion of said single motion transmitting flexible member connected to said one portion of said motion converting member and said second portion of said single motion transmitting flexible member connected to the sickle bar.

12. The assembly of claim 9 wherein said motion converting member is rotatably mounted generally between said idler members of said first pair thereof.

13. The assembly of claim 1 wherein said one portion of said motion converting member is a connector member mounted thereon radially outwardly from said axis so that said connector member orbits about said axis as said motion converting member rotates about said axis.

14. In a mowing implement including a mobile frame, a power drive source mounted on said frame and having a rotatable output drive shaft for providing rotary drive motion, and a sickle bar mounted on said frame for undergoing reciprocatory movement relative to said frame, a drive motion transmitting assembly comprising:
(a) a motion converting member rotatably mounted on said frame about an axis and drivingly coupled to said output drive shaft of said power drive source for rotating about said axis upon rotation of said output drive shaft, said motion converting member having one portion spaced from said axis which undergoes orbital movement about said axis as said motion converting member rotates about said axis;
(b) a plurality of idler members rotatably mounted on said frame adjacent to and remote from both said sickle bar and said motion converting member and in spaced relation to one another for guiding the transmission of drive motion from said motion converting member to said sickle bar; and
(c) a motion transmitting flexible arrangement entrained about said idler members for undergoing reciprocatory movement relative thereto, said motion transmitting flexible arrangement including a first portion connected to said one portion of said motion converting member and a second portion connected to said sickle bar such that said motion transmitting flexible arrangement reciprocally moves and transmits reciprocatory drive motion to said sickle bar as said motion converting member rotates and applies orbital motion to said motion transmitting flexible arrangement.

15. The implement of claim 14 wherein said motion converting member also has an opposite portion spaced from said axis in opposite relation to said one portion such that, as said motion converting member rotates about the axis, said opposite portion undergoes an orbital movement about said axis that counterbalances the orbital movement of said one portion about the axis.

16. The implement of claim 14 wherein said first portion of said motion transmitting flexible arrangement is a first elongated motion-transmitting flexible member entrained about a first group of said idler members and connected to said one portion of said motion converting member.

17. The implement of claim 16 wherein said second portion of said motion transmitting flexible arrangement is a second elongated motion-transmitting flexible member entrained about a second group of said idler members and connected to said sickle bar.

18. The implement of claim 14 wherein said idler members include a first pair of said idler members being rotatably mounted remote from the sickle bar and in spaced relation to one another.

19. The implement of claim 18 wherein said idler members also include a second pair of said idler members being rotatably mounted adjacent to the sickle bar and in spaced relation to one another and to said idler members of said first pair thereof.

20. The implement of claim 19 wherein said motion transmitting arrangement is a single elongated motion-transmitting flexible member entrained about said first and second pairs of idler members and having said first portion of said single motion transmitting flexible member connected to said one portion of said motion converting member and said second portion of said single motion transmitting flexible member connected to the sickle bar.

21. The assembly of claim 18 wherein said motion converting member is rotatably mounted generally between said idler members of said first pair thereof.

22. A hand-guided mowing implement, comprising:
(a) a mobile frame having rotatable ground-engaging wheels;
(b) a set of handlebars mounted on said frame for use in manually moving said mobile frame;
(c) a power drive source mounted on said frame and having a rotatable output drive shaft for providing rotary drive motion;
(d) a sickle bar mounted on said frame for undergoing reciprocatory movement relative to said frame; and
(e) a drive motion transmitting assembly including
(i) a motion converting member rotatably mounted on said frame about an axis and drivingly coupled to said output drive shaft of said power drive source for rotating about said axis upon rotation of said output drive shaft, said motion converting member having one portion spaced from said axis which undergoes orbital movement about said axis as said motion converting member rotates about said axis;

(ii) a plurality of idler members rotatably mounted on said frame adjacent to and remote from both said sickle bar and said motion converting member and in spaced relation to one another for guiding the transmission of drive motion from said motion converting member to said sickle bar; and (iii) a motion transmitting flexible arrangement entrained about said idler members for undergoing reciprocatory movement relative thereto, said motion transmitting flexible arrangement including a first portion connected to said one portion of said motion converting member and a second portion connected to said sickle bar such that said motion transmitting flexible arrangement reciprocally moves and transmits reciprocatory drive motion to said sickle bar as said motion converting member rotates and applies orbital motion to said motion transmitting flexible arrangement.

* * * * *